(12) United States Patent
Fabris et al.

(10) Patent No.: US 12,041,340 B2
(45) Date of Patent: Jul. 16, 2024

(54) CONTROLLER AND METHOD FOR PROVIDING AN OPERATIONAL SETTING OF AN IMAGING DEVICE

(71) Applicant: LEICA MICROSYSTEMS CMS GMBH, Wetzlar (DE)

(72) Inventors: Stefan Fabris, Schwalmstadt (DE); Patric Pelzer, Wetzlar (DE); Marco Bingel, Kirchhain (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 211 days.

(21) Appl. No.: 17/610,462

(22) PCT Filed: May 12, 2020

(86) PCT No.: PCT/EP2020/063133
§ 371 (c)(1),
(2) Date: Nov. 11, 2021

(87) PCT Pub. No.: WO2020/229448
PCT Pub. Date: Nov. 19, 2020

(65) Prior Publication Data
US 2022/0311933 A1    Sep. 29, 2022

(30) Foreign Application Priority Data

May 15, 2019   (EP) ..................................... 19174697

(51) Int. Cl.
*H04N 23/62*   (2023.01)
*G02B 21/36*   (2006.01)
*H04N 23/60*   (2023.01)

(52) U.S. Cl.
CPC ............. *H04N 23/64* (2023.01); *G02B 21/36* (2013.01); *H04N 23/62* (2023.01)

(58) Field of Classification Search
CPC ......... H04N 23/64; H04N 23/62; G02B 21/36
USPC ............................................... 348/79
See application file for complete search history.

(56) References Cited

U.S. PATENT DOCUMENTS

| 6,154,289 A | 11/2000 | Hara |
| 6,858,821 B2 * | 2/2005 | Arnold ................. G05B 19/106 219/412 |
| 11,012,615 B2 * | 5/2021 | Wakabayashi ......... G03B 17/18 |
| 2004/0000639 A1 | 1/2004 | Storz |
| 2011/0317891 A1 | 12/2011 | Kajimoto et al. |

(Continued)

FOREIGN PATENT DOCUMENTS

| CN | 102368110 A | 3/2012 |
| CN | 104813325 A | 7/2015 |

(Continued)

*Primary Examiner* — Trang U Tran
(74) *Attorney, Agent, or Firm* — LEYDIG, VOIT & MAYER, LTD.

(57) ABSTRACT

A controller for providing an operational setting of an imaging device is configured to provide a user with a preferred operational setting for acquiring an image. The controller is also configured to receive a user input and generate a response information based on the user input, the response information indicating whether or not the image generated by the imaging device is accepted by the user. The controller is further configured to update the preferred operational setting using a machine learning algorithm based on the response information.

13 Claims, 2 Drawing Sheets

(56) References Cited

U.S. PATENT DOCUMENTS

| | | | |
|---|---|---|---|
| 2014/0063219 A1 | 3/2014 | Stonefield et al. | |
| 2016/0077007 A1 | 3/2016 | Demos et al. | |
| 2018/0173852 A1* | 6/2018 | Lou .................... | A61B 6/032 |
| 2019/0053857 A1 | 2/2019 | Sugie et al. | |

FOREIGN PATENT DOCUMENTS

| | | |
|---|---|---|
| CN | 107003242 A | 8/2017 |
| CN | 108697304 A | 10/2018 |
| DE | 102014102080 A1 | 8/2015 |
| EP | 3 340 251 A1 | 6/2018 |

\* cited by examiner

CONTROLLER AND METHOD FOR PROVIDING AN OPERATIONAL SETTING OF AN IMAGING DEVICE

CROSS REFERENCE TO RELATED APPLICATIONS

This application is a U.S. National Phase application under 35 U.S.C. § 371 of International Application No. PCT/EP2020/063133, filed on May 12, 2020, and claims benefit to European Patent Application No. EP 19174697.3, filed on May 15, 2019. The International Application was published in English on Nov. 19, 2020 as WO 2020/229448 A1 under PCT Article 21(2).

FIELD

The present invention relates to a controller and a method for providing an operational setting of an imaging device. Further, the present invention relates to an imaging system comprising an imaging device and a controller for providing an operational setting thereof.

BACKGROUND

In the field of microscopy, it is a crucial demand to find an operational setting of the microscope in order to achieve an optimal image quality. Usually, the operational setting comprises a plurality of setting parameters which have to be optimized simultaneously before the image acquisition can be started. Optimizing the setting parameters is a cumbersome and time-consuming task for a user, which has to be repeated for each image acquisition. Therefore, in order to achieve an optimal image quality in an easy and reproducible manner, it is highly desirable to provide the user with a tool to make it easier for him or her to select an optimal operational setting.

Recently, machine learning algorithms have been developed assisting the user to find a proper operational setting without having to adjust a large number of setting parameters each time the microscope is used. An example of a microscope system using a machine learning algorithm for providing an operational setting is disclosed in the document DE 10 2014 102 080 A1. The machine learning algorithm disclosed therein allows the microscope system to learn rules according to which setting parameters are adjusted. This learning of the system happens during the manufacturing or development cycle of the microscopes.

SUMMARY

In an embodiment, the present disclosure provides a controller for providing an operational setting of an imaging device. The controller is configured to: provide a user with a preferred operational setting for acquiring an image; receive a user input and generate a response information based on the user input, the response information indicating whether or not the image generated by the imaging device is accepted by the user; and update the preferred operational setting using a machine learning algorithm based on the response information.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
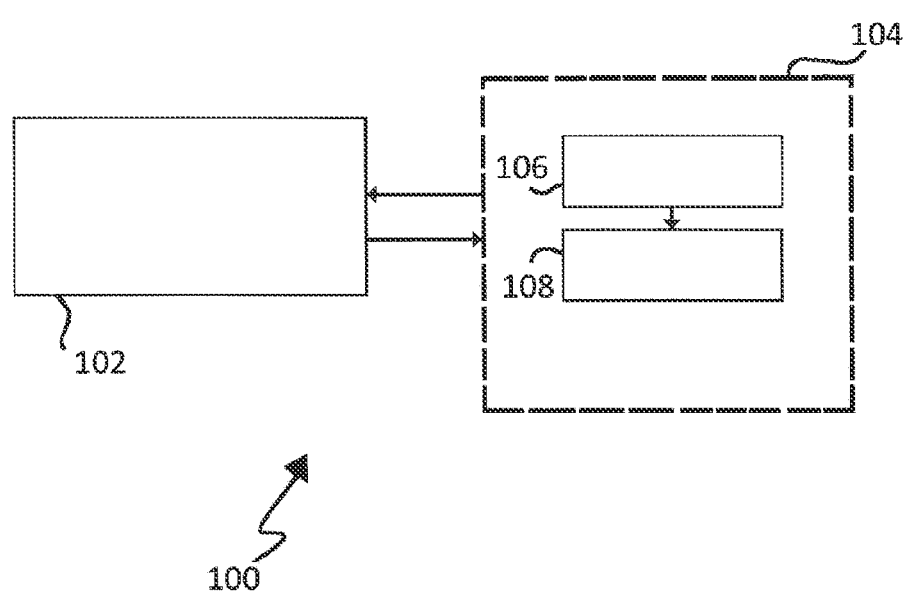
FIG. 1 is a block diagram showing an imaging system including a controller according to an embodiment.

Embodiments of the present invention provide a controller and a method for enabling a user to find a proper operational setting of an imaging device fast and with minimum effort. Further, an embodiment of the present invention provides an imaging system comprising a controller of the afore-mentioned type.

In order to enable a user to find a proper operational setting of an imaging device fast and with minimum effort, a controller for providing an operational setting of an imaging device is provided according to an embodiment of the present invention. The controller is configured to provide a user with a preferred operational setting for acquiring an image. The controller is further configured to receive a user input and to generate a response information based on the user input, said response information indicating whether or not the image generated by the imaging device is accepted by the user. The controller is further configured to update the preferred operational setting using a machine learning algorithm based on the response information.

The operational setting of the imaging device may comprise a plurality of setting parameters which are suitable to operate the imaging device as desired. In particular, the operational setting may comprise parameters determining the quality of an object image generated by the imaging device.

The response information may comprise information indicating whether the image generated by the imaging device is discarded by the user, or if a setting parameter is varied by the user.

Before an image is acquired, the controller provides the user with a preferred operational setting. This preferred operational setting may directly be used for the subsequent image acquisition, i.e. without being changed by the user prior to the image acquisition. Alternatively, the preferred operational setting may be changed by the user before the image is acquired. In such a case, the preferred operational setting is overwritten with the changed operational setting, this changed operational setting subsequently being used for the image acquisition.

After the image has been acquired based on the operational setting, which may be the afore-mentioned preferred setting provided by the controller in the first place or the setting changed by the user and overwriting the preferred setting, the controller receives a user input based on which the controller can decide whether or not the image generated by the imaging device according to the selected operational setting is discarded by the user. Subsequently, based on this response information derived from the user input, the controller updates the preferred operational setting applying a machine learning algorithm.

The response information represents a simple decision criterion which can be used by the machine learning algorithm for updating the preferred operational setting of the imaging device efficiently. In particular, as the response information is generated based on the user input during the imaging operation performed by the imaging device, the process for updating the operational setting using the machine learning algorithm can be performed while the user is actually working with the imaging device. Thus, it is not necessary to implement a separate learning process preceding the actual image acquisition during which the user is working with the imaging device. In other words, the user does not have to manually vote if the acquired image is a good one or not, as it is e.g. taught by the aforementioned document DE 10 2014 102 080 A1. In contrast, the controller according to embodiments of the present invention concludes based on the behavior of the user if the acquired image is a good one or not. Based on the conclusion the controller can feed the machine learning algorithm.

The proposed controller enables a reliable prediction of a preferred operational setting and an immediate application of the predicted setting. Thus, it is possible to improve the work flow, and the user is relieved of the need to adjust a plurality of setting parameters before the image acquisition can even be started. The prediction is based on preceding user inputs which indicate whether the current image acquired in the on-going imaging process is accepted by the user or discarded.

Preferably, the controller is further configured to conclude that the image is a good image when the response information indicates that the image is not discarded by the user, to conclude that the image is not a good image when the response information indicates that the image is discarded by the user, and to correspondingly feed the machine learning algorithm with an information indicating whether or not the image was concluded to be a good image. In the following, a good image may be understood as an image meeting the user's expectations in particular in terms of image quality so that the resulting user input subsequent to the image acquisition indicates that the image is accepted, i.e. not discarded by the user. Thus, a good image may be an image with which the user continues to work during the imaging process in one way or another. An image not accepted by the user to be a good image as defined above will be referred to as a bad image hereinafter.

According to a preferred embodiment, the controller is configured to update the preferred operational setting further based on the operational setting used for acquiring the image. The latter setting, which is used for image acquisition, may be either the afore-mentioned preferred operational setting, which is provided by the controller in the first place, or a setting which is deliberately adjusted by the user to be used for the image acquisition. This deliberately adjusted setting may be derived from the preferred operational setting.

In this embodiment, the update of the preferred operational setting, i.e. the prediction of a next setting to be used for image acquisition, is made on the basis of the previous setting. Thus, the controller may feed the machine learning algorithm with the current operational setting in order to make a decision on an operational setting which is likely to be required by the user at a later stage.

Preferably, the controller is configured to update the preferred operational setting so as to reinforce the operational setting used for acquiring the image when the image was concluded to be a good image, and/or to update the preferred operational setting so as to attenuate the operational setting used for acquiring the image when the image was concluded not to be a good image. In such an embodiment, a reinforcement machine learning may be performed in such a way that a good image causes a reinforcement of the selected operational setting, so to speak, the update of the preferred operational setting integrates the setting used for acquiring the image. In contrast, a bad image causes an attenuation of the current operational setting, i.e. the update of the preferred operational setting departs from the setting used for acquiring the image. For instance, it is assumed that a preferred setting parameter has value A. Then, the user overwrites A with a changed parameter value B, and the image is acquired based on value B. In case that the acquired image is a good image, then the subsequent preferred parameter may be B. On the other hand, in case that the acquired image is a bad image, the next preferred setting parameter may be again A.

According to a preferred embodiment, the controller is configured to generate the response information indicating that the image is discarded if after acquiring the image a setting parameter of a first group of parameters of the operational setting is changed by the user compared to the previous operational setting with which the image was acquired.

Preferably, the first group of parameters includes at least one of histogram setting, exposure time setting, gain setting, contrast setting, illumination light setting, objective setting, position setting, time setting, repetition setting, binning setting, high dynamic range (HDR) setting, digital fusion setting, color/black-and-white setting, automatic exposure ON/OFF setting, and confocal microscopy setting.

The illumination light setting may comprise a setting for each light type including an ON/OFF setting for a ring light in combination with light segments, an ON/OFF setting for coaxial light, an ON/OFF setting for transmitted light. The objective setting may comprise a setting for selecting an objective for an overview image, for z-stacks and z-stack heights. The position setting may comprise a setting for rows, columns and combinations thereof. The time setting may comprise a setting for a time period, a time interval, etc. The confocal microscopy setting may comprise an averaging number setting, a speed setting, a format setting, a bidirectional scan ON/OFF setting, a pinhole size setting, a motorized correction ring setting, an automatic gain ON/OFF setting, an emission setting, an excitation light setting, a dye setting.

Preferably, the controller is configured to generate the response information indicating that the image is not discarded if after acquiring the image a setting parameter of a second group of parameters of the operational setting is changed by the user compared to the previous operational setting.

Preferably, the second group of parameters includes at least one of a zoom setting and a stage setting.

In a further preferred embodiment, the controller is configured to generate the response information indicating that the image is not discarded if the image is stored or further processed, i.e. further manipulations are used. The further processing may comprise annotations, measurements, cropping, etc.

According to another aspect, an imaging system is provided, comprising an imaging device and a controller for providing an operational setting of the imaging device as explained above.

The controller may be configured to control the imaging device automatically based on the updated operational setting.

In a preferred embodiment, the imaging device is a microscope system, for instance a confocal microscope system.

According to another aspect, a method for providing an operational setting of an imaging device is provided, comprising the following steps: providing a user with a preferred operational setting for acquiring an image; receiving a user input and generating a response information based on the user input, said response information indicating whether or not the image generated by the imaging device is discarded by the user; and updating the preferred operational setting using a machine learning algorithm based on the response information.

According to another aspect, a computer program is provided with a program code for performing the method, when the computer program is run on a processor.

An imaging system 100 according to an embodiment is shown in the block diagram of FIG. 1. In the present embodiment, the imaging system 100 is formed by a microscope system.

The imaging system 100 comprises an imaging device 102, e.g. a microscope, and a controller 104. In embodiments of the present invention, the controller 104 may include an input module 106 and a learning module 108. Both modules 106, 108 may be implemented in hardware and/or software. Further, in the present embodiment, the controller 104 is configured to control the overall operation of the imaging system 100.

In particular, the controller 104 provides a user with a preferred operational setting when starting the imaging device 102. This preferred operational setting may comprise a plurality of setting parameters which serve to control the imaging device 102 in order to acquire an image. The preferred operational setting may have been stored in advance in memory means included in the controller 104. In order to inform the user on the preferred operational setting, the imaging system 100 may comprise e.g. a monitor on which the preferred operational setting is displayed.

Optionally the preferred operational information may be adjusted or selected in dependence on information about a sample to be imaged. A user interface may be configured to receive sample information which is input by a user. Alternatively, information about the sample is gathered by a measurement and that results of this measurement are transferred in the form of sample information to the user interface. Such measurements can provide information on specific sample characteristics without the need of a user inputting such information into the user interface. Also both ways of receiving such information, i.e. by user input and by sample measurements, are possible. Depending on the information about sample properties received through the user interface, the controller 104 may automatically adjust one or more microscope components of the microscope.

After the preferred operational setting has been selected and/or adjusted, the imaging device 102 is operated in order to generate the image. For this, the imaging device 102 is either controlled based on the preferred operational setting or based on an operational setting which has been changed by the user before the image is acquired. In the latter case, the preferred operational setting may be overwritten in the memory means of the controller 104 in response to a corresponding user input.

After the image has been captured by the imaging device, the input module 106 of the controller 104 receives a user input made by the user by means of a suitable input device included in the imaging system 100. Such an input device may be a control panel, a keyboard etc. configured to transmit the user input to the input module 106. The controller 104 is configured to generate a response information based on the user input, i.e. to derive said response information from the user input such that the response information indicates whether or not the image generated by the imaging device 102 is accepted or discarded by the user or if a setting parameter is varied by the user.

Subsequently, based on the response information derived from the user input, the controller 104 updates the preferred operational setting using the learning module 108. For this, the learning module 108 is configured to apply a machine learning algorithm on input data including the response information. This algorithm enables a prediction of an operational setting which is assumed to be preferred by the user when operating the imaging device for the next image acquisition. In this respect, it is worth noting that the controller 104 is configured to update the operational setting by means of the learning module 108 while the user is actually working with the imaging device 102. In other words, the image acquisition and the process for updating the operational setting are performed simultaneously. Thus, the controller 104 is enabled to control the imaging device 102 automatically based on the updated operational setting.

Figure 2:
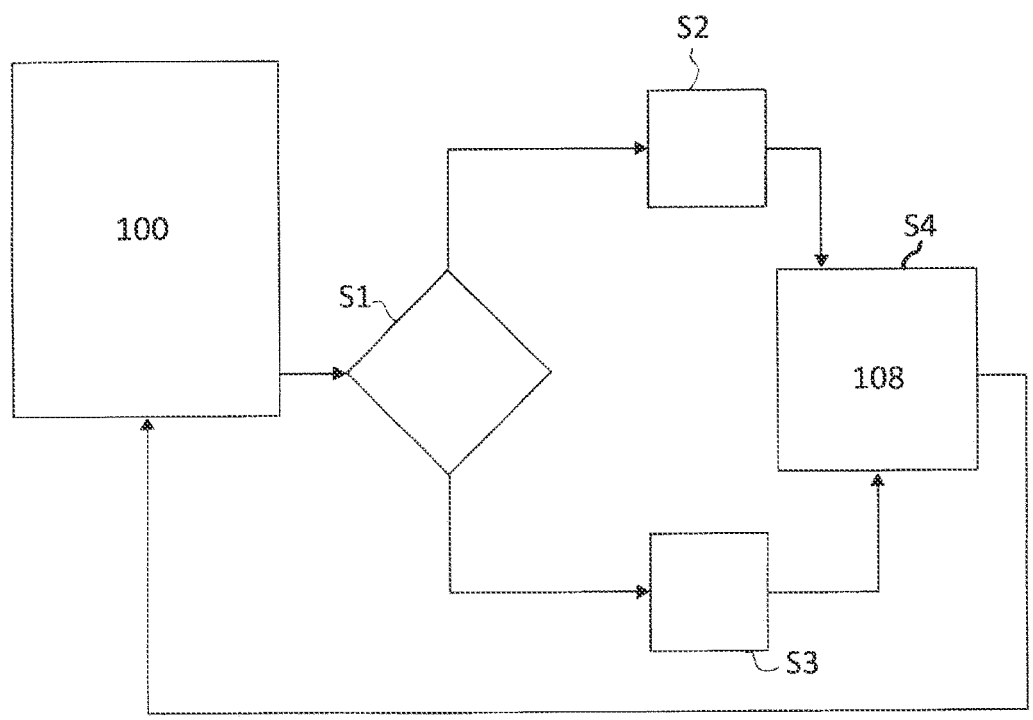
FIG. 2 is a flow chart illustrating a work flow for providing an operational setting of the imaging device.

In addition to the response information indicating whether or not the image generated by the imaging device 102 has been discarded by the user, the learning module 108 of the controller 104 may be further fed with the operational setting which is currently used for acquiring the image in order to predict the next update of the setting. Where the preferred operational information is adjusted or selected in dependence on information about the sample, the learning module 106 of the controller 104 may also be fed with the operational settings FIG. 2 is a flow chart illustrating an exemplary workflow for updating the operational setting of the imaging device 102 included in the imaging system 100 of FIG. 1. For the sake of simplicity, FIG. 2 is a kind of hybrid diagram combining elements of a block diagram and a flow diagram. In particular, FIG. 2 illustrates the interaction between the learning module 108 and the remaining parts of the imaging system 100.

In step S1 of the workflow shown in FIG. 2, the controller 104 determines whether or not the image generated by the imaging device 102 is discarded by the user. For this, the controller 104 analyses the response information derived from the user input which is entered by the user in response to the image presented to him or her e.g. by being displayed on a monitor. If the controller 104 determines in S1 that the image is discarded, the controller 104 concludes in step S2 that the image is a good image. On the other hand, if the controller determines in S1 that the image is discarded by the user, the controller concludes the image in step S3 to be a bad image.

The conclusion whether or not the image is discarded, i.e. whether the image is a good image or a bad image, may be drawn depending on whether one or more specific setting parameters of the operational setting are changed by the user after the image has been acquired. For instance, the image may be concluded to be a bad image, i.e. discarded (step S3) if after acquiring the image a setting parameter of a first group of parameters of the operational setting is changed by the user compared to the previous operational setting with which the image was acquired. The afore-mentioned first group of parameters may include at least one of histogram setting, exposure time setting, gain setting, contrast setting, illumination light setting, objective setting, position setting, time setting, repetition setting, binning setting, HDR setting, digital fusion setting, color/black-and-white setting, automatic exposure ON/OFF setting, and confocal microscope setting.

On the other hand, the image may be concluded to be a good image, i.e. accepted by the user, or not discarded (step S2), if after acquiring the image a setting parameter of a second group of parameters of the operational setting is changed by the user compared to the previous operational setting with which the image was acquired. For instance, the afore-mentioned second group of parameters may include at least one of a zoom setting and a stage setting. In other words, the image is not discarded if only the zoom and/or stage setting has been changed. Further, the image may be concluded to be a good image, i.e. not discarded if the image has been stored or further processed in another way. Thus, such a further processing of the image indicates that the user is willing to continue using the image and thus has accepted the image.

In step S4 of the work flow shown in FIG. 2, the learning module 108 of the controller 102 is fed with a response information which indicates whether the current image is concluded to be a good image or a bad image. Further, in the present embodiment, the learning module 108 is further fed with the operational setting that was used for acquiring the current image. Applying the learning algorithm taking into account the afore-mentioned information, the learning module 108 makes a prediction based on which the preferred operational setting to be used in the next image acquisition is updated. As a result, the learning module 108 provides the imaging system 100 with the updated preferred operational setting to be used next.

When using the operational setting which was used for acquiring the current image, the learning module may update the preferred operational setting either in the affirmative or in the negative of the operational setting. Thus, the learning module 108 may be configured to apply a reinforcement machine learning in such a way that a good image causes a reinforcement of the selected operational setting whereas a bad image causes an attenuation of the current operational setting.

The image may be a single acquired image, a sequence or set of acquired images, or may be a "live" image, which is to say a sequence of distinct images or frames continuously acquired, displayed and updated by the microscope.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 imaging system
102 imaging device
104 controller
106 input module
108 learning module
S1 to S4 method steps

The invention claimed is:

1. An imaging system comprising an imaging device and a controller, wherein the controller is configured to:
provide a user with a preferred operational setting of the imaging device for acquiring an image;
control the imaging device to acquire the image using an operational setting based on the preferred operational setting with or without alteration by the user;
after the image has been acquired, receive a user input, the user input being a behavior of the user while the user is working with the imaging device, the behavior of the user indicating whether the user is changing a setting parameter of the operational setting for a next image acquisition,
generate a response information based on the user input, the response information indicating whether or not the image is accepted by the user based on whether or not the user is changing the setting parameter of the operational setting for the next image acquisition; and
update the preferred operational setting using a machine learning algorithm based on the response information.

2. The imaging system according to claim 1, wherein the controller is further configured to:
conclude that the image is a good image based on the response information indicating that the image is not discarded by the user,
conclude that the image is not a good image based on the response information indicating that the image is discarded by the user, and
correspondingly feed the machine learning algorithm with an information indicating whether or not the image was concluded to be a good image.

3. The imaging system according to claim 1, wherein the controller is further configured to update the preferred operational setting based on the operational setting used for acquiring the image.

4. The imaging system according to claim 3, wherein the controller is further configured to:
update the preferred operational setting so as to reinforce the operational setting used for acquiring the image in a case that the image is concluded to be a good image, and/or
update the preferred operation setting so as to attenuate the operational setting used for acquiring the image in a case that the image is concluded not to be a good image.

5. The imaging system according to claim 1, wherein the controller is configured to generate the response information indicating that the image is discarded in a case that, after acquiring the image, the setting parameter of a first group of parameters of the operational setting is changed by the user compared to the previous operational setting with which the image was acquired.

6. The imaging system according to claim 5, wherein the first group of parameters includes at least of one of a histogram setting, exposure time setting, gain setting, contrast setting, illumination light setting, objective setting, position setting, time setting, repetition setting, binning setting, high dynamic range (HDR) setting, digital fusion setting, color/black-and-white setting, automatic exposure ON/OFF setting, or confocal microscopy setting.

7. The imaging system according to claim 6, wherein the controller is configured to generate the response information indicating that the image is not discarded in a case that, after acquiring the image, the setting parameter of a second group of parameters of the operational setting is changed by the user compared to the previous operational setting with which the image was acquired.

8. The imaging system according to claim 7, wherein the second group of parameters includes at least one of a zoom setting or a stage setting.

9. The imaging system according to claim 1, wherein the controller is configured to generate the response information indicating that the image is not discarded in a case that the image is stored or further processed.

10. The imaging system according to claim 1, wherein the controller is further configured to control the imaging device automatically based on the updated preferred operational setting.

11. The imaging system according to claim 1, wherein the imaging system is a microscope system.

12. A method for providing an operational setting of an imaging device, the method comprising:
providing a user with a preferred operational setting of the imaging device for acquiring an image;
causing the imaging device to acquire the image based on the preferred operational setting with or without alteration by the user;
after the image has been acquired, receiving a user input, the user input being a behavior of the user while the user is working with the imaging device, the behavior of the user indicating whether the user is changing a setting parameter of the operational setting for a next image acquisition,
generating a response information based on the user input, the response information indicating whether or not the image is discarded by the user based on whether or not the user is changing the setting parameter of the operational setting for the next image acquisition; and
updating the preferred operational setting using a machine learning algorithm based on the response information.

13. A tangible, non-transitory computer-readable medium having instructions thereon which, upon being executed by one or more processors, causes execution of the method according to claim 12.

* * * * *